United States Patent [19]
Plutowski et al.

[11] Patent Number: 5,821,715
[45] Date of Patent: Oct. 13, 1998

[54] PULSED ALIGNMENT COMMUTATION STATE FOR SENSORLESS MOTOR START

[75] Inventors: Eugene F. Plutowski; Robert W. Warren, both of Rochester, Minn.

[73] Assignee: Western Digital Corporation, Irvine, Calif.

[21] Appl. No.: 687,738

[22] Filed: Jul. 26, 1996

[51] Int. Cl.[6] .................................................. H02P 1/04
[52] U.S. Cl. ........................ 318/472; 318/603; 318/634; 318/484; 388/815
[58] Field of Search ..................................... 318/723, 722, 318/715, 696, 685, 254, 138, 798, 800, 799, 439, 603, 634, 635, 430, 445, 452, 471, 472, 484; 388/806, 815

[56] References Cited

U.S. PATENT DOCUMENTS

| | | | |
|---|---|---|---|
| 4,420,715 | 12/1983 | Lecourtier et al. | 318/301 |
| 4,565,957 | 1/1986 | Gary et al. | 318/723 |
| 4,839,754 | 6/1989 | Gami et al. | 360/73.01 |
| 4,879,498 | 11/1989 | Shinohara | 318/254 |
| 5,399,953 | 3/1995 | Yoshino | 318/799 |
| 5,412,809 | 5/1995 | Tam et al. | 395/750 |
| 5,442,272 | 8/1995 | Schwartz | 318/778 |
| 5,457,365 | 10/1995 | Blagaila et al. | 318/430 |
| 5,466,999 | 11/1995 | Hutsell | 318/431 |
| 5,489,831 | 2/1996 | Harris | 318/701 |

*Primary Examiner*—John W. Cabeca
*Attorney, Agent, or Firm*—Leo J. Young, Esq.; Milad G. Shara, Esq.

[57] ABSTRACT

A start-up controller is programmed to reduce current to a motor during a coast phase of an alignment state of the motor. The alignment state is divided into a plurality of phases based on time elapsed from the start of the alignment phase and the controller reduces the current when the elapsed time is substantially between a start and end time that define the coast phase. Because reduced current is provided to the motor during the coast phase, the total power and thus the thermal load on control components for the motor is decreased while the time the motor requires to "settle" into alignment is only slightly increased.

2 Claims, 3 Drawing Sheets

PULSED ALIGNMENT COMMUTATION STATE FOR SENSORLESS MOTOR START

FIELD OF THE INVENTION

The present invention is related to electric motors and in particular the start-up power consumption of a spindle motor that spins a hard disk drive assembly.

BACKGROUND OF THE INVENTION

One of the most critical periods in the operation of an electric motor is when it begins to accelerate from a complete stop until it reaches full speed ("spin-up"). In order to overcome inertia, the motor demands more current on spin-up than when it is freely spinning after reaching full speed. High power consumption generates a correspondingly high amount of heat which is both wasteful and damaging to thermally sensitive control components for the motor. Furthermore, if the power supply for the motor is capable of supporting the maximum amount of current needed during spin-up, the power supply cannot be optimized for normal operations of the motor. Therefore, most motors contain some type of controller which is programmed to monitor the amount of current drawn by the motor and to limit it to a maximum, safe value. Most motor power supplies are chosen to be more efficient during normal operations than during spin-up. These solutions require a delicate balancing act between limiting current to a safe value while not unacceptably increasing the spin-up time of the motor.

When current is first applied to the motor, the motor oscillates between two magnetic poles in the motor. As the oscillations die down due to drag forces inherent in the motor, the motor is captured, or locked, into one position. At this point motor commutation can begin and current supplied to the motor will cause it to rotate.

The time from the first application of current to the locking of the motor into position is referred to as the "alignment state." The time it takes the oscillation to die out is referred to as the "position settle time." One problem with a motor that has low drag forces is that the position settle time can be fairly lengthy and during the settle time the components that control the flow of current to the motor are subject to high thermal loads which stress those components and increase their failure rate. One solution is to limit the amount of current available to the motor during the alignment state, but this results in a much longer settle time.

What is needed is a mechanism that minimizes the settle time while simultaneously protecting the motor components from thermal overloads.

SUMMARY OF THE INVENTION

A start-up controller is programmed to reduce current to a motor during a portion of an alignment state of the motor. The alignment state is divided into a plurality of phases based on time elapsed from the start of the alignment state. One of the phases is an initial phase when the motor begins accelerating from a zero velocity; the next phase is a coast phase when the coil of the motor is approaching a magnetic pole; the final phase is the settle phase when the coil is aligned and then locked into position. The start-up controller provides full current to the motor during the initial phase to begin the acceleration, reduces current to the motor at the start of the coast phase, and resumes full current when the motor enters the settle phase to align the windings and the magnetic pole in minimum time.

Because reduced current is provided to the motor during the coast phase, the total power and thus the thermal load on the control components for the motor is decreased while the time the motor requires to "settle" into alignment is only slightly increased over the settle time of a motor given full current throughout the alignment state. This represents an improvement over the prior art which protected the control components at the expense of greatly increasing the settle time of the motor by limiting current to the motor throughout the alignment state.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Numbering in the Figures is usually done with the hundreds digits corresponding to the figure number, with the exception that identical components which appear in multiple figures are identified by the same reference numbers. Signals and connections may be referred to by the same number or label, and the actual meaning should be clear from the context of use.

Figure 1:
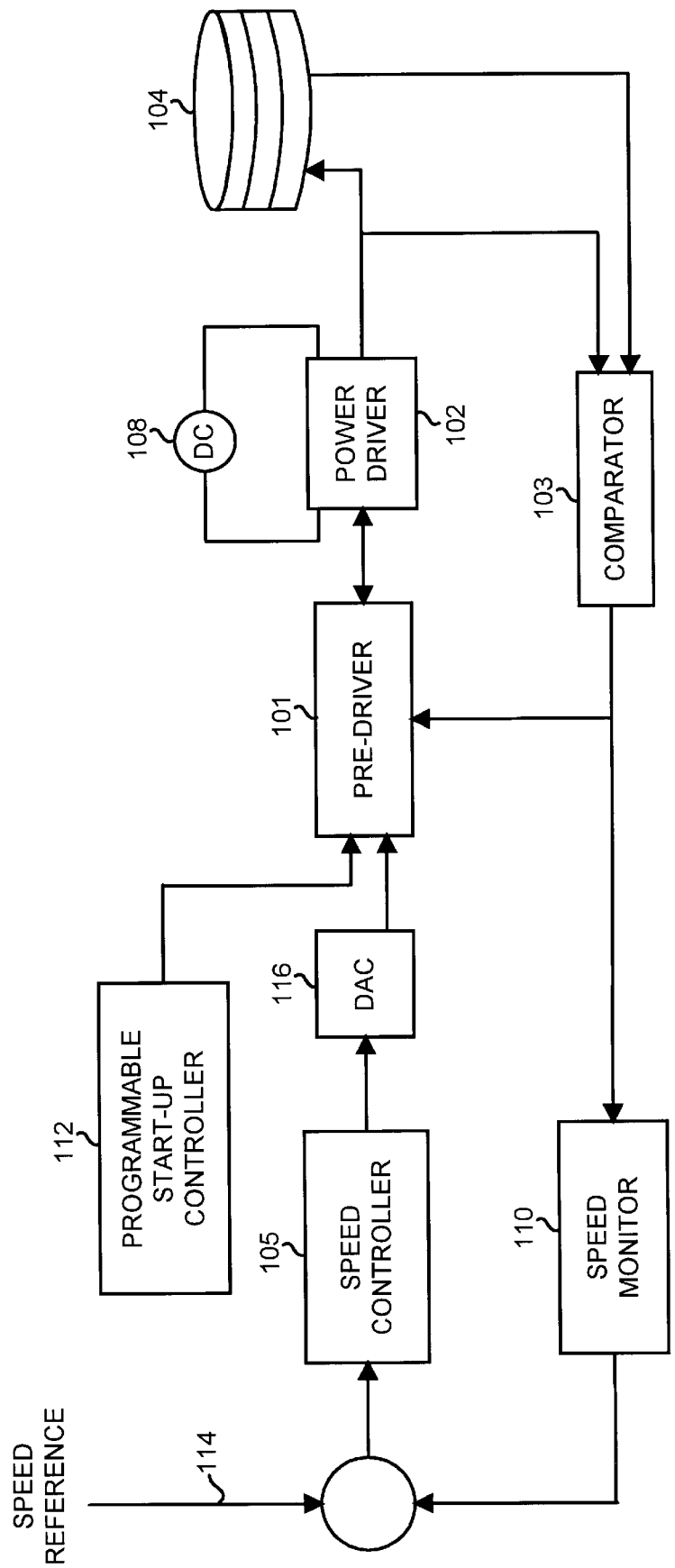
FIG. 1 is a block diagram of a hard disk drive system incorporating a start-up controller programmed to reduce current to a motor during a portion of an alignment state of the motor.

FIG. 1 shows a block diagram of a hard disk drive system that incorporates a programmable start-up controller 112 that reduces current to a spindle motor 104 during a portion of an alignment state of the motor 104. The spindle motor 104 is incorporated into a hard disk drive assembly (shown as part of 104) and is used to spin the drive assembly. The motor 104 is powered by a DC power supply 108 that is coupled to the motor 104 through a power driver 102 which controls the current provided to the motor 104. A pre-driver 101 coupled to the power driver 102 determines the amount of current that is supplied to the motor 104 and sets the power driver 102 accordingly. An actual motor speed signal is generated by coupling the motor 104 and the power driver 102 to a comparator 103. A speed controller 105 coupled to a speed reference signal 114 and the comparator 103 generates a reference motor speed signal. The pre-driver 101 is coupled to the speed controller 105 through a digital-to-analog converter (DAC) 116 and to the comparator 103. During normal operations of the hard disk drive system, the pre-driver 101 determines the setting of the power driver 102 by comparing the actual motor speed signal with the reference motor speed signal. The pre-driver 101 adjusts the power driver setting to maintain the actual motor speed in compliance with the speed reference signal 114.

Standard off-the-shelf hard drive controllers include components comparable to the power driver 102, the pre-driver 101, the comparator 103, the speed controller 105, the speed reference 114 and the DAC 116. The arrangement of such components can be different from that shown in FIG. 1 without exceeding the scope of the invention. Furthermore, the blocks in FIG. 1 do not necessarily correspond to actual individual components in a standard drive controller as will be apparent to those of skill in the art.

During an alignment state of the motor, the pre-driver 101 determines the power driver setting in accordance with a start-up indicator signal generated by a programmable start-up controller 112 which is coupled to the pre-driver 101. When current is first supplied to the motor, the motor enters the alignment state and the controller 112 initializes a timer that begins tracking time elapsed since the start of the alignment state. The controller 112 is programmed with at least two time values, a start time and an end time that represent the beginning and end of a coast phase of the alignment state. When the elapsed time is substantially between the start and end times, the controller 112 instructs the pre-driver 101 to reduce the setting of the power driver 101 to limit current supplied to the motor 104. Before and after the coast phase, the controller 112 instructs the pre-driver 101 to permit full current to flow to the motor 104.

In one embodiment, the current is limited during the coast phase by reducing the current flowing through the power driver 102 while in another embodiment, the power driver 102 prevents any current from reaching the motor 104 during the coast phase.

In an alternate embodiment, the controller 112 is programmed with additional times that divide the alignment state into three phases defined by increments of elapsed time. The first phase is an initial phase when the motor begins accelerating from a zero velocity; the next phase is the coast phase when windings of the motor are approaching a magnetic pole; the final phase is the settle phase when the windings are aligned with the magnetic pole. The times that define the start and end of each phase are determined through modeling studies and experimentation to determine what times lead to the greatest power reduction with the least effect on the settle time of the motor.

In another alternate embodiment, the power driver 102 is a variable duty cycle power driver which supplies current to the motor 104 during its duty cycle. The controller 112 limits the current to the motor 104 by instructing the pre-driver to reduce the duty cycle of the power driver 102.

The programmable start-up controller 112 can be a programmable device, such as a microprocessor, that is dedicated to the alignment state, or it can be incorporated into a programmable device already present in the standard controller depending on the configuration of the standard controller used in the hard disk drive system. The elapsed time can be generated using a dedicated timer in the programmable start-up controller 112 or calculated from values available from clocks already incorporated into the standard controller. Other implementations will be apparent to those skilled in the art.

Figure 2:
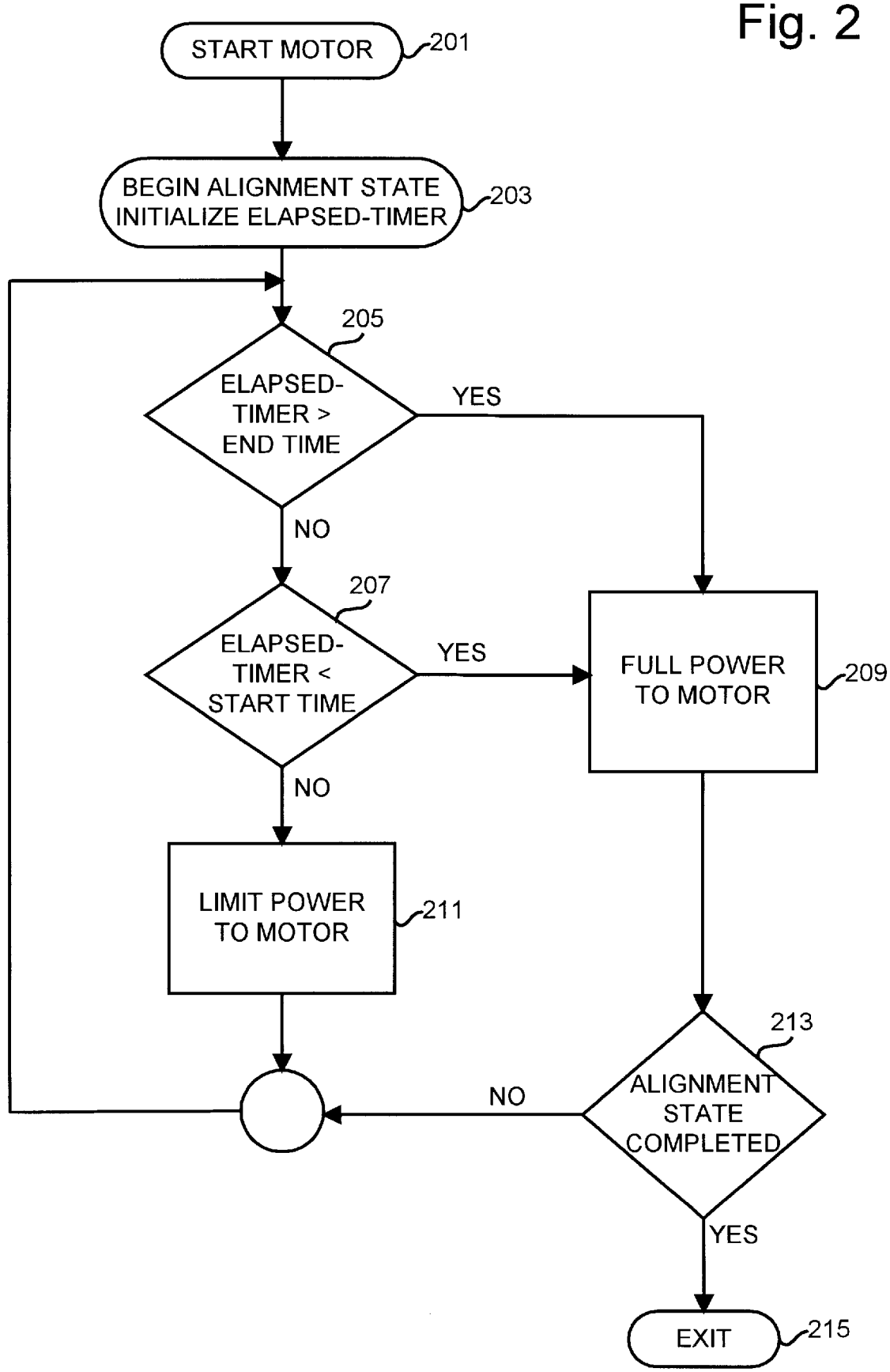
FIG. 2 is a logic flow diagram illustrating an embodiment of the programming for the controller shown in FIG. 1.

FIG. 2 illustrates the logic flow of one embodiment of the programming in the controller 112. Although the logic flow is described in terms commonly associated with a computer software program, the scope of the invention is intended to cover alternate embodiments of the program in various forms such as hardware, firmware, logic circuits and state machines as well as in software. That the logic flow is capable of being expressed in still other alternate embodiments that support logic programming will be apparent to those skilled in the art. Furthermore, the program can be stored on various forms of storage medium, including RAM or ROM memory, floppy disk, hard disk, or can be downloaded into the controller 112 as is commonly done with flash BIOS updates without departing from the nature of the invention.

The programming in the controller 112 is initiated when the motor is started (block 201). When the motor enters its alignment, an elapsed time parameter ("elapsedtimer") is initialized that represents time elapsed since beginning the alignment state at block 203. In one embodiment, the elapsed time parameter is generated using a separately designated timer within the disk drive system, while in an alternate embodiment, the elapsed time parameter is generated by comparing a present time with the time at which the motor began the alignment state. Other mechanisms for generating the elapsed time parameter will be apparent to those skilled in the art.

The controller 112 compares the elapsed time parameter against an end time value that represents the end of the coast phase at block 205. If the elapsed time parameter is greater than the end time value at block 205, the controller 112 signals the pre-driver 101 to provide full current to the motor 104 (block 209). The controller 112 then determines if the alignment state is completed (block 213) and if so, exits the program at block 215. Depending on the configuration of the standard disk controller, the controller 112 can either next execute a standard stepper motor approach commutation program to spin up the motor or pass control of the remainder of the start-up process to another component in the system.

If the elapsed time parameter is not greater than the end time value at block 205, the controller 112 next compares the elapsed time parameter to a start time value representing the beginning of the coast phase at block 207. While the timer parameter is not less than the start time value, the controller 112 instructs the pre-driver 101 to reduce the amount of current provided to the motor 104 (block 211).

If, however, the elapsed time parameter is less than the start time value at block 207, the controller 112 instructs the pre-driver 101 to provide full current to the motor at block 209. The controller 112 then determines if the alignment state is completed (block 213).

If the alignment state is not completed, the controller 112 continues to compare the elapsed time parameter against the start time and end time values at blocks 205 and 207 in accordance with the logic described above until the test at block 213 is satisfied and the alignment state is completed.

When the controller 112 determines the motor 104 is in the coast phase of the alignment state, the controller 112 instructs the pre-driver 101 to reduce current to the motor 104. When the controller 112 determines the motor 104 is in either the initial or settle phases of the alignment state, the controller 112 instructs the pre-driver 101 to provide full current to the motor 104.

Furthermore, the mathematical relationships between the start and end times of the coast phase and the timer parameter can be modified to include equality conditions as will be apparent to those skilled in the art.

In one embodiment, the controller 112 determines that the alignment state is completed when the elapsed time parameter is no longer less than a value that represents the end of the alignment state. Alternate embodiments that determine the completion of the alignment state in other ways will be apparent to those skilled in the art.

Figure 3B:
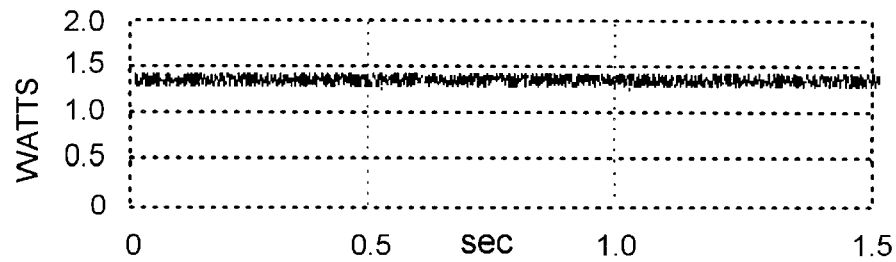
FIG. 3B is a graph plotting power consumed by the system of FIG. 3A during the alignment state.
Figure 3A:
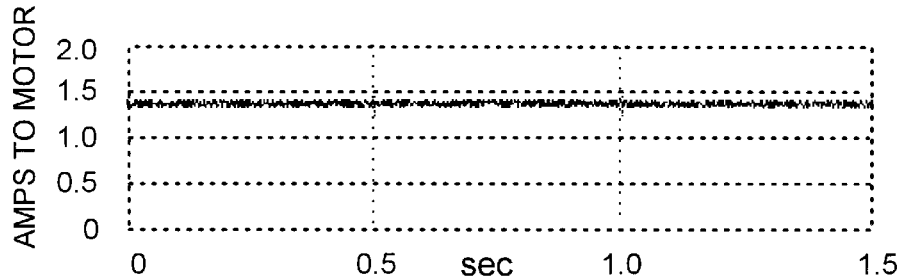
FIG. 3A is a graph plotting current provided to a motor in a prior art hard disk drive system against time elapsed since the beginning of an alignment state.
Figure 3C:
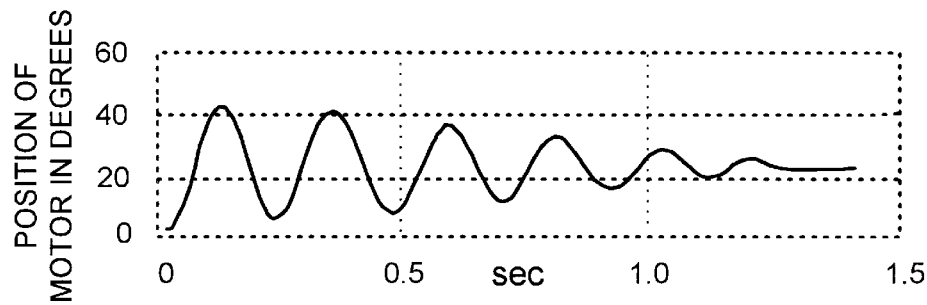
FIG. 3C is a graph plotting positions of the motor of FIG. 3A during the alignment state.
Figure 4B:
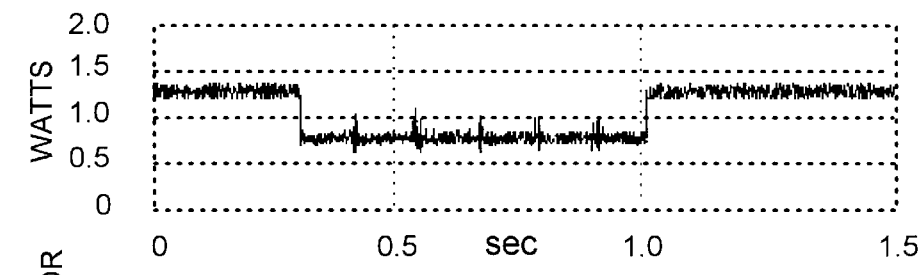
FIG. 4B is a graph plotting power consumed by the system of FIG. 4A during the alignment state.
Figure 4A:
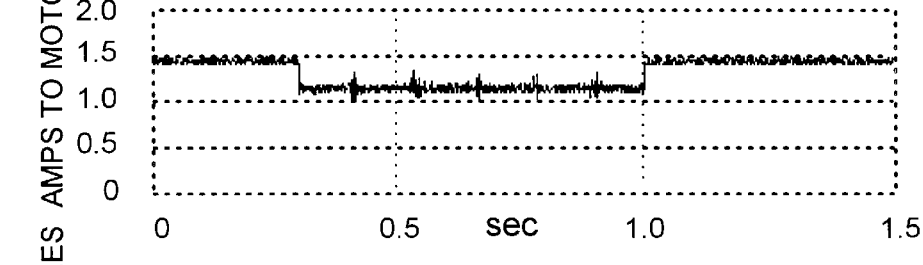
FIG. 4A is a graph plotting current provided to a motor in a hard disk drive system incorporating the start-up controller of FIG. 1 against time elapsed since the beginning of an alignment state.
Figure 4C:
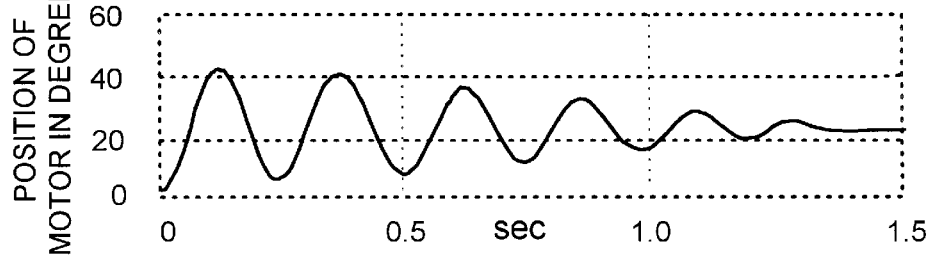
FIG. 4C is a graph plotting positions of the motor of FIG. 4A during the alignment state.

FIGS. 3A, 3B and 3C show characteristics of a prior art hard disk drive system during an alignment state. FIG. 3A is a graph plotting current provided to a motor in the prior art hard drive disk system during the alignment state using a variable duty cycle power drive and shows a constant average current flowing to the motor. FIG. 3B is a graph plotting power consumed by the system during the alignment state and shows that a constant amount of power is consumed. FIG. 3C is a graph plotting positions of the motor during the alignment state and shows the amount of time necessary for the motor to settle into a stable position. FIGS. 4A, 4B and 4C are the corresponding graphs for a hard disk drive system that incorporates the start-up controller 112.

As can been seen by comparing the graphs of the two hard disk drive systems, the amount of power consumed by the system using the controller 112 is reduced considerably when the average current flowing to the motor is reduced but the amount of time required for the motor to settle into stable position is almost identical between the two systems.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for reducing power consumption and thermal loads on control components that provide motor current to a spindle motor in a disk drive during an alignment state of a spin-up operation, the alignment state having an initial period for starting the spindle motor from a zero velocity, a coast period for coasting the spindle motor towards a known position, and a settle period for aligning and locking the spindle motor at the known position, the method comprising the steps of:

maintaining an elapsed time parameter that represents time elapsed from start of the alignment state, the coast period beginning when the elapsed time parameter has a first value and ending when the elapsed time parameter has a second value, the initial period preceding the coast period, the settle period following the coast period;

providing motor current having a first average magnitude to the spindle motor throughout the initial period;

reducing the motor current supplied to the spindle motor to a second average magnitude throughout the coast period;

increasing the motor current supplied to the spindle motor to a third average magnitude throughout the settle period;

whereby reducing the motor current during the coast period of the alignment state reduces the power consumption and the thermal loads on the control components.

2. A disk drive having a spindle motor, a power supply, and a variable duty cycle power driver for supplying motor current to the spindle motor from the power supply during an alignment state of a spin-up operation, the spindle motor consuming power during the alignment state that results in thermal loads on the power driver, the alignment state having an initial period for starting the spindle motor from a zero velocity, a coast period for coasting the spindle motor towards a known position, and a settle period for aligning and locking the spindle motor at the known position, the disk drive comprising:

a controller coupled to the power driver for controlling the motor current provided to the spindle motor during the alignment state;

means for maintaining an elapsed time parameter that represents time elapsed from start of the alignment state, the coast period beginning when the elapsed time parameter has a first value and ending when the elapsed time parameter has a second value, the initial period preceding the coast period, the settle period following the coast period;

the controller commanding the power driver to:
      provide motor current having a first average magnitude to the spindle motor throughout the initial period;
      reduce the motor current supplied to the spindle motor to a second average magnitude throughout the coast period;
      increase the motor current supplied to the spindle motor to a third average magnitude throughout the settle period;

whereby reducing the motor current during the coast period of the alignment state reduces the power consumed by the spindle motor and the thermal loads on the power driver.

* * * * *